(12) United States Patent
Knox, II et al.

(10) Patent No.: US 10,213,719 B2
(45) Date of Patent: Feb. 26, 2019

(54) CAM LOCK SYSTEM FOR RECIPROCATING AIR COMPRESSOR INLET FILTER

(71) Applicant: Westinghouse Air Brake Technologies Corporation, Wilmerding, PA (US)

(72) Inventors: Steven J. Knox, II, Pittsburgh, PA (US); Christopher Lucke, Plum, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 469 days.

(21) Appl. No.: 14/872,799

(22) Filed: Oct. 1, 2015

(65) Prior Publication Data

US 2016/0096132 A1    Apr. 7, 2016

Related U.S. Application Data

(60) Provisional application No. 62/059,583, filed on Oct. 3, 2014.

(51) Int. Cl.
| | | |
|---|---|---|
| *B01D 46/00* | (2006.01) | |
| *F16B 2/18* | (2006.01) | |
| *F04B 39/16* | (2006.01) | |
| *B01D 46/24* | (2006.01) | |

(52) U.S. Cl.
CPC ..... *B01D 46/0004* (2013.01); *B01D 46/0005* (2013.01); *B01D 46/2403* (2013.01); *F04B 39/16* (2013.01); *F16B 2/18* (2013.01); *F16B 2/185* (2013.01); *B01D 2265/02* (2013.01)

(58) Field of Classification Search
CPC ............ B01D 46/0005; B01D 46/2403; B01D 46/2411; B01D 2265/025; B01D 46/0004; B01D 2265/02; F16B 2/18; F16B 2/185; F04B 39/16
See application file for complete search history.

(56) References Cited

U.S. PATENT DOCUMENTS

| | | | |
|---|---|---|---|
| 3,000,086 A * | 9/1961 | Davis | F16B 5/06 |
| | | | 24/453 |
| 5,005,813 A | 4/1991 | Lawrence | |
| 6,368,388 B1 * | 4/2002 | Kosmider | B01D 46/0004 |
| | | | 55/490 |
| 2010/0139205 A1* | 6/2010 | Testu | E04H 3/16 |
| | | | 52/706 |
| 2011/0283884 A1 | 11/2011 | Larsen et al. | |
| 2012/0060454 A1 | 3/2012 | Banks et al. | |

(Continued)

*Primary Examiner* — Robert Clemente
(74) *Attorney, Agent, or Firm* — The Webb Law Firm

(57) ABSTRACT

A cam lock system for an air intake filter housing is provided that includes a clevis rod adapted for connection to a bolt on the air intake filter housing; a cam handle; a filter clamp coupled to the cam handle, the filter clamp having one or more cam surfaces thereon, the cam handle and filter clamp pivotally connected to a first end of the clevis rod; a spring carrier disposed at the second end of the clevis rod; and a spring disposed on the clevis rod and restrained between the spring carrier and a washer disposed on the clevis rod. The cam surface engages the washer and pivotal movement of the cam handle and filter clamp causes compression of the spring via the washer to provide clamping force to secure an air filter element in the air intake filter housing.

8 Claims, 6 Drawing Sheets

(56) References Cited

U.S. PATENT DOCUMENTS

2013/0255208 A1* 10/2013 Zhang ............... B01D 46/0005
    55/496
2014/0237880 A1    8/2014 Clifton
2015/0155696 A1*  6/2015 Coenegracht ........ G02B 6/4444
    174/564

* cited by examiner

CAM LOCK SYSTEM FOR RECIPROCATING AIR COMPRESSOR INLET FILTER

CROSS REFERENCE TO RELATED APPLICATIONS

This application claims benefit under 35 U.S.C. § 119(e) of provisional patent application Ser. No. 62/059,583, filed Oct. 3, 2014, the contents of which are incorporated herein in their entirety.

BACKGROUND OF THE INVENTION

Field of the Invention

The present disclosure relates to air compressor inlet filters and, particularly, structure for securing an air compressor inlet filter element within a filter housing.

Description of Related Art

As is well-known, air compressors include filter element(s) that need routine replacement during maintenance. The air filter elements are typically disposed in an air intake filter housing. In many existing air compressor air intake filter housings, there is a nylock nut (or other type of elastic stop nut) and washer that are used to fasten the air inlet filter element into the filter housing using an end cap. The end cap is secured by the nut and washer. This current arrangement requires the use of hand tools when replacing the air filter element. It is desirable to replace this well-known mechanical arrangement with a tool-less arrangement that does not require the use of hand tools for air filter element replacement.

SUMMARY OF THE INVENTION

As described above, the current mechanical arrangement for securing an air filter element in an air intake filter housing uses a nylock nut and washer. This known mechanical arrangement may be upgraded according to this disclosure to include a tool-less cam lock system that eliminates the need for wrenches and like hand tools during the maintenance step of replacing an air filter element. This device, as disclosed herein, can be easily applied to an existing filter housing by removing the existing lock nut and washer that are used to clamp the filter element into the air intake filter housing using an end cap. The lock nut and washer are replaced with the device, described in detail herein, which comprises a tool-less cam lock system. The new design eliminates the need for a tool to change the air filter element.

In one aspect, a cam lock system for an air intake filter housing is provided that includes a clevis rod adapted for connection to a bolt on the air intake filter housing; a cam handle; a filter clamp coupled to the cam handle, the filter clamp having one or more cam surfaces thereon, the cam handle and filter clamp pivotally connected to a first end of the clevis rod; a spring carrier disposed at the second end of the clevis rod; and a spring disposed on the clevis rod and restrained between the spring carrier and a washer disposed on the clevis rod. The cam surface engages the washer and pivotal movement of the cam handle and filter clamp causes compression of the spring via the washer to provide clamping force to secure an air filter element in the air intake filter housing.

In another aspect, a cam lock system for an air intake filter housing is provided, the cam lock system comprising a clevis rod adapted for connection to the air intake filter housing; a cam lever; a filter clamp coupled to the cam lever, the filter clamp having one or more cam surfaces thereon and being pivotally connected to a first end of the clevis rod; a spring carrier disposed at the second end of the clevis rod; and a spring disposed on the clevis rod and restrained between the spring carrier and a washer disposed on the clevis rod. The cam surface interacts with the washer and pivotal movement of the cam lever and filter clamp causes compression of the spring via the washer so as to provide a clamping force to secure a filter end cap upon an open end of the air intake filter housing.

In yet another aspect, a method of retaining an air filter element within an air intake filter housing is provided, the method comprising providing a filter end cap sized to close an open end of the air intake filter housing; and providing a cam lock device connectable to the air intake filter housing and engageable with the filter end cap, wherein the cam lock device comprises a cam lever and a filter clamp having one or more cam surfaces thereon such that rotation of the cam lever and filter clamp in a first direction provides a clamping force to secure the filter end cap upon the open end of the air intake filter housing.

Further details and advantages of the various aspects described in detail herein will become clear upon reviewing the following detailed description of the various aspects in conjunction with the accompanying drawing figures.

DESCRIPTION OF THE INVENTION

Figure 1:
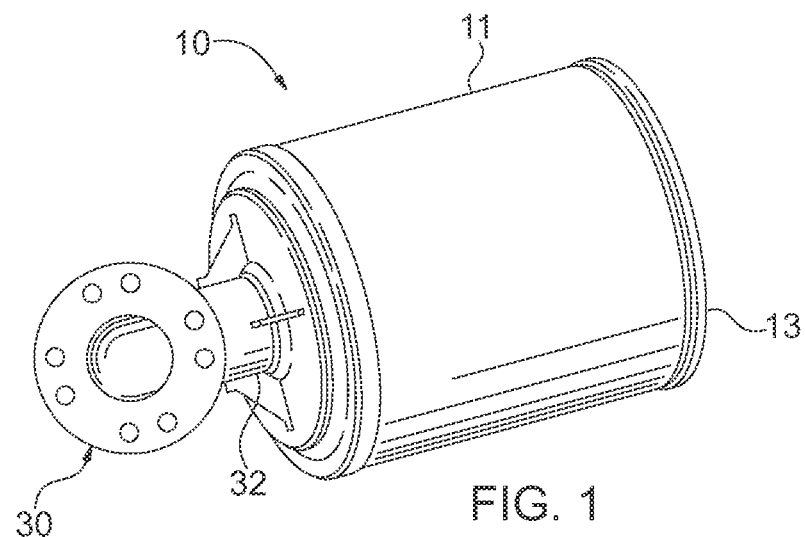
FIG. 1 is a perspective view of a known air compressor filter housing.
Figure 2:
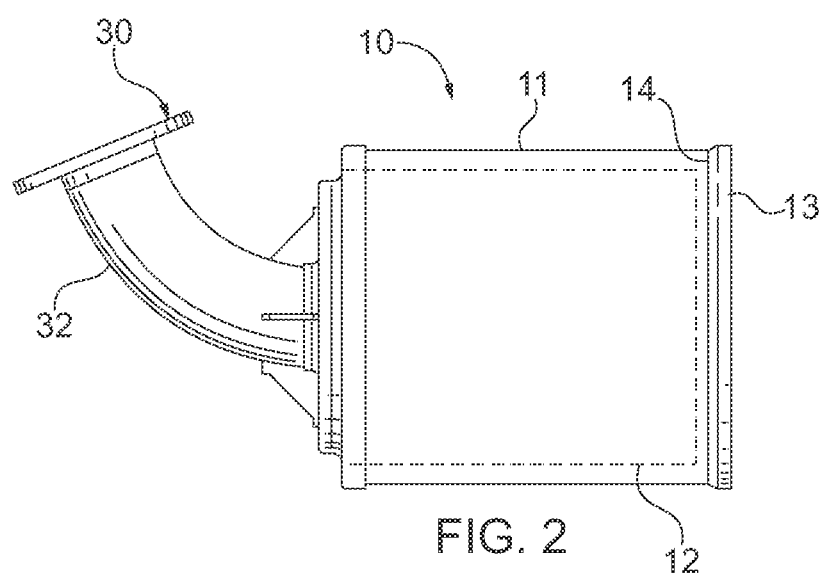
FIG. 2 is a cross-sectional view of the air compressor filter housing shown in FIG. 1
Figure 3:
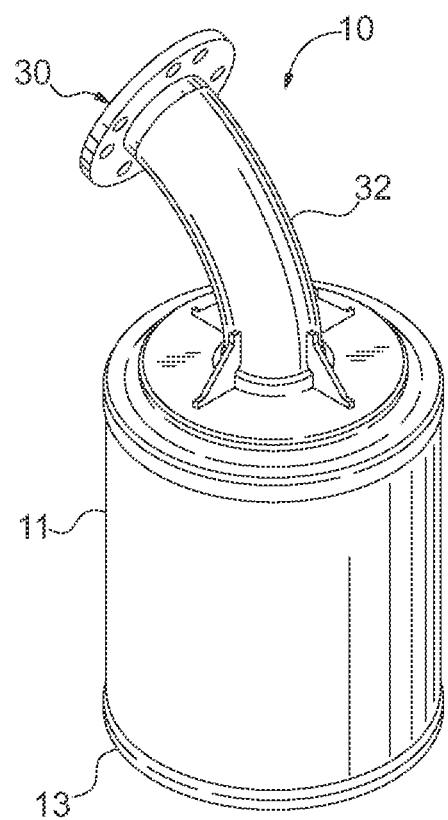
FIG. 3 is a second perspective view of the air compressor filter housing shown in FIG. 1.
Figure 4:
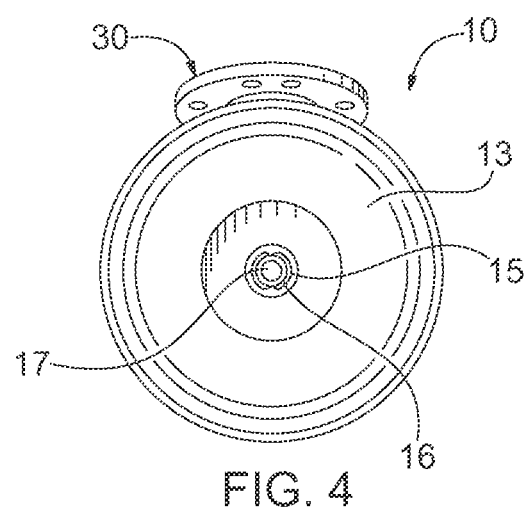
FIG. 4 is an end view of the air compressor filter housing shown in FIG. 1

The following description is provided to enable those skilled in the art to make and use the described aspects contemplated for carrying out the disclosure. Various modifications, equivalents, variations, and alternatives, however, will remain readily apparent to those skilled in the art. Any and all such modifications, variations, equivalents, and alternatives are intended to fall within the spirit and scope of the present disclosure. Further, for purposes of the description hereinafter, spatial orientation terms, if used, shall relate to the disclosure as it is oriented in the drawing figures. However, it is to be understood that the disclosure may assume various alternative variations and step sequences, except where expressly specified to the contrary.

It is also to be understood that the specific devices and processes illustrated in the attached drawings, and described in the following specification, are simply exemplary aspects of the disclosure. Hence, specific dimensions and other physical characteristics related to the aspects disclosed herein are not to be considered as limiting. For the purpose of facilitating understanding of the disclosure, the accompanying drawings and description illustrate preferred aspects thereof, from which the disclosure, various aspects of its structures, construction and method of operation, and many advantages may be understood and appreciated.

Referring to FIGS. 1-4, a known air intake filter housing 10 for an air compressor is illustrated. The filter housing 10 comprises an annular housing 11 enclosing an air filter element 12. Air filter element 12 may comprise any appropriate filter media, such as foam, paper, etc. A filter end cap 13 is held in place at an open end 14 of the annular housing 11 via a washer 15 and lock nut 16 attached to an appropriate mechanical element 17, such as a bolt. Mechanical element 17 is arranged within filter housing 10 such that tightening of lock nut 16 (via, for example, a wrench or other tool) urges filter end cap 13 against open end 14 to retain air filter element 12 within filter housing 10. Filter housing 10 further comprises a flange 30 and a pipe 32 in fluid communication with air filter element 12. Flange 30 is configured to be coupled about an air intake port (not shown) of an air compressor so as to deliver filtered air to the air compressor.

As described above, lock nut 16 must be removed via a tool (e.g., a wrench) to allow for removal of filter end cap 13 and enable access to air filter element 12 therein. Such reliance on a separate tool to gain access within annular housing 11 is undesirable. Additionally, several small, removable parts are detached from filter housing 10 when filter end cap 13 is removed, and these small, removable parts are prone to being misplaced or reinstalled incorrectly.

Figure 5:
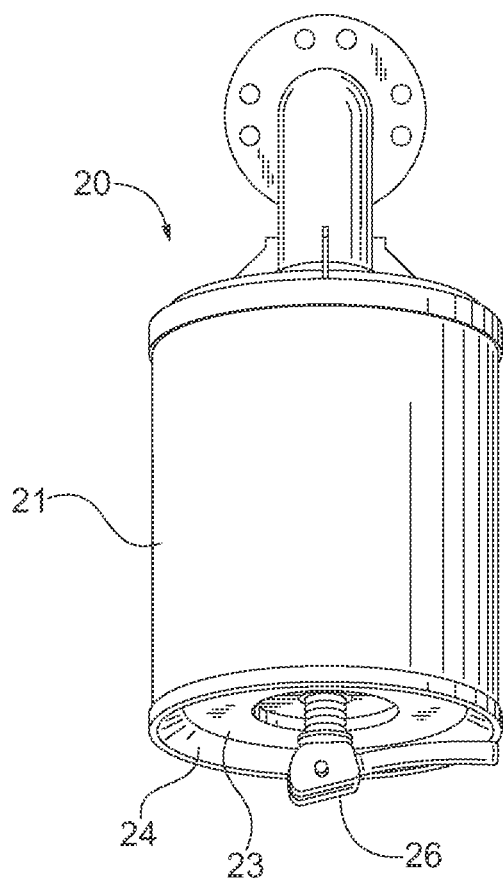
FIG. 5 is a perspective view of an air compressor filter housing comprising a cam lock system.
Figure 6:
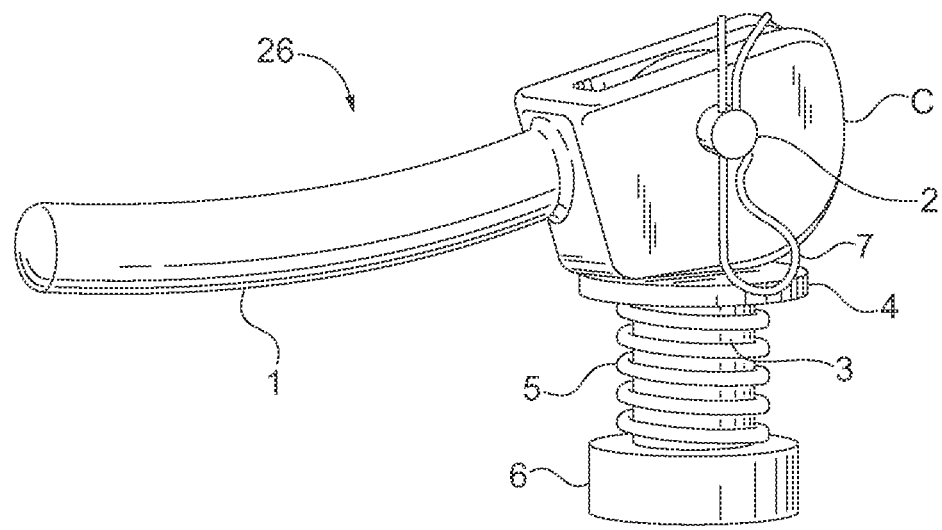
FIG. 6 is a perspective of the cam lock system depicted in FIG. 5.
Figure 7:
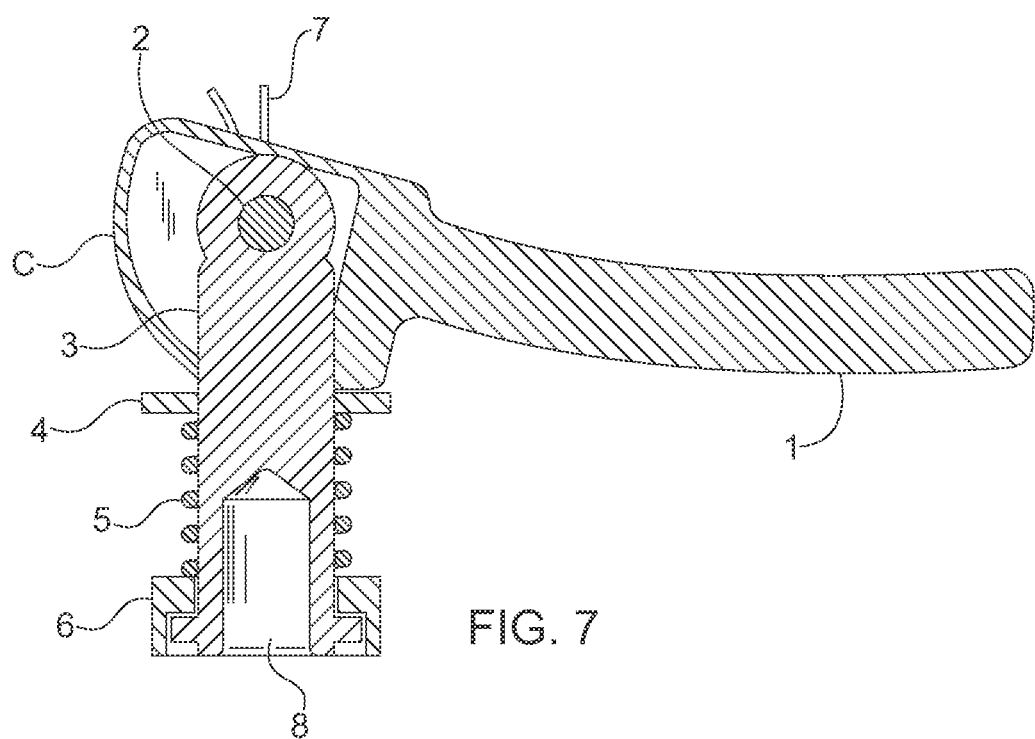
FIG. 7 is a cross-sectional view of the cam lock system shown in FIG. 6.

Referring now to FIGS. 5-7, various aspects of an air intake filter housing 20 in accordance with an aspect of the present invention will now be described. Air intake filter housing 20 has a similar basic structure as that of air intake filter housing 10 shown in FIGS. 1-4. Namely, air intake filter housing 20 comprises an annular housing 21 enclosing an air filter element (not shown but similar to air filter element 12 of FIG. 2). A filter end cap 23 is held in place at an open end 24 of the annular housing 21 via a cam lock system or device 26 according to one aspect of this disclosure. As noted above, in existing air compressor air intake filter housings (such as filter housing 10), there is a washer and nylock nut (e.g., washer 15 and lock nut 16) that are used to fasten the air filter element 12 into the filter housing 10 by securing the filter end cap 13 on the open end 14 of the annular housing 11. This mechanical arraignment requires the use of hand tools when replacing an air filter element 12 contained within the annular housing 11.

Conversely, the 'tool-less' cam lock device 26 eliminates the need for hand tools and the like by employing a spring that is compressed via a cam and, as a result, applies the necessary clamping force needed to fasten the filter end cap 13 on the open end 14 of the annular housing 11, thereby securing the air inlet filter element 12 in the annular housing 11. In the present embodiment, filter housing 20 makes use of a bolt or like mechanical element similar to mechanical element 17 described above with respect to FIGS. 1-4. Again, it is upon this mechanical element 17 that the end cap 13 is secured using the washer 15 and lock nut 16 in the known filter housing 10 shown in FIGS. 1-4. However, the action of the cam lock device 26 does not require the use of hand tools and the like to change an air filter element 12.

As shown in FIGS. 5-7, a cam lock system 26 comprises a filter clamp cam handle 1 which is pivotally mounted at first end thereof by a retaining pin 2 to a clevis rod or end stud 3. A clamp washer 4 and spring 5 are disposed on the clevis rod 3, and the spring 5 is restrained between the washer 4 and a spring carrier 6. A cotter pin 7 may be provided to secure the pivotal connection between the cam handle 1 and the retaining pin 2. A threaded blind hole 8 may be provided in the proximal or second end of the clevis rod 3 to secure the cam lock system 26 onto an existing bolt (not shown, but similar to bolt 17 described previously with respect to FIGS. 1-4) of the filter housing 20.

The cam handle 1 defines a cam surface C and, as noted, the cam handle 1 is pivotally connected to a first end of the clevis rod 3. The spring carrier 6 is disposed at the second end of the clevis rod 3. The spring 5 is disposed on the clevis rod 3 and is restrained between the spring carrier 6 and the washer 4, which is likewise disposed on the clevis rod 3. The cam surface C engages the washer 4, and pivotal movement of the cam handle 1 causes compression of the spring 5 between the washer 4 and the springe carrier 6 to provide clamping force. This clamping force is sufficient to secure an air filter element 12 in the air intake filter housing 20.

In use, cam handle 1 is rotated counterclockwise until the handle is approximately 180 degrees, thereby putting the cam lock device 26 into a released state. The clevis rod 3 is threaded onto the existing bolt or stud (not shown but similar to bolt 17 described previously) present on the filter housing 20. The entire cam lock device 26 is rotated clockwise using the cam handle 1 until the clevis rod 3 bottoms out on the bolt or stud. Once the cam lock device 26 is installed, the cam handle 1 is rotated clockwise. As a result of this rotation, the cam handle 1 pivots around the clevis rod 3 via the retaining pin 2. This action starts the compression of the spring 5 that is encapsulated between the clamp washer 4 and the spring carrier 6, as the cam profile or surface C on the cam handle 1 provides axial displacement. The force generated from the compression of the spring 5 transfers into the spring carrier 6, resulting in a clamp force necessary to retain the filter element (not shown but similar to air filter element 12) and the filter end cap 23. Once the cam handle 1 is fully engaged, the cam on the cam handle 1 transitions onto a flat on the cam handle 1, locking it into place via the clamping washer 4 as a result. In order to replace the filter element (not shown but similar to air filter element 12) during maintenance, the process described is reversed. Accordingly, the foregoing tool-less cam lock device 26 is a fully encapsulated design that has no loose parts.

Next, referring to FIGS. 8-10C, a cam lock device 40 in accordance with an alternative aspect of the invention is shown. Cam lock device 40 operates similarly to cam lock device 26 described above with respect to FIGS. 5-7. That is, as a cam lever 42 is rotated between "open" and "closed" positions, a compression force is placed on a filter end cap (not shown, but similar to filter end cap 23 described previously). This compression force on the filter end cap acts to hold the filter end cap in place with respect to an annular housing (not shown) so as to retain an air filter element therein.

Figure 8:
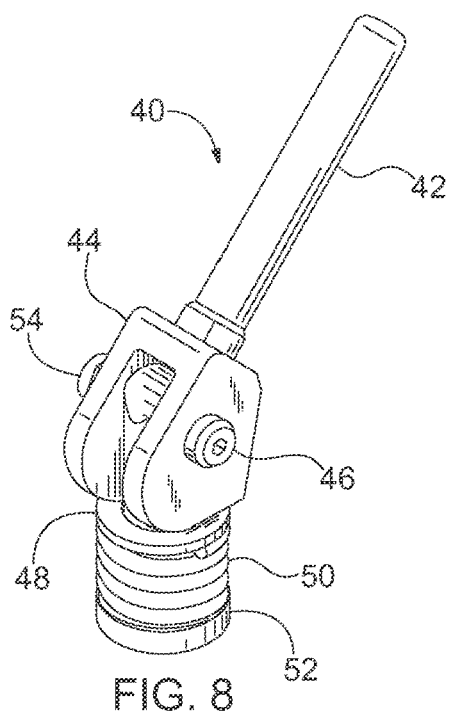
FIG. 8 is a perspective view of a cam lock system in accordance with an alternative aspect of the invention.
Figure 9:
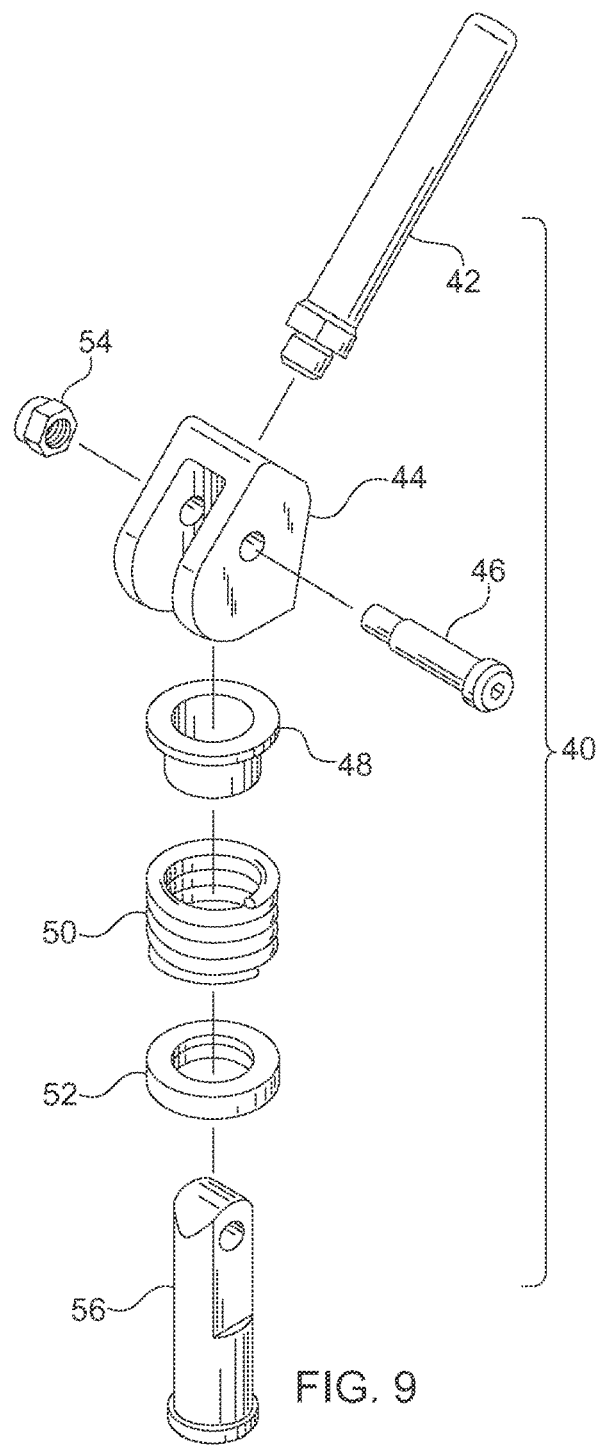
FIG. 9 is an exploded view of the cam lock system shown in FIG. 8.

As is shown in FIGS. 8-9, cam lock device 40 comprises a cam lever 42 coupled to a filter clamp 44 via an appropriate engagement, such as a threaded engagement, press-fit engagement, etc. Filter clamp 44 is rotatably coupled to a clevis rod 56 via a fastener 46. Fastener 46 may be, for example, a retaining pin, a screw, or a bolt which may be engaged with a nut 54 on a distal end thereof to allow for pivotal rotation of filter clamp 44. Clevis rod 56 is threaded or otherwise engaged onto an existing bolt or stud (not shown, but similar to bolt 17 described previously) present on the filter housing. A clamp washer 48 and spring 50 are disposed on the clevis rod 56, with the spring 50 being restrained between the clamp washer 48 and a spring carrier 52. As will be described in more detail hereinbelow with respect to FIGS. 10A-10C, various cam surfaces of filter clamp 44 interact with clamp washer 48, with pivotal movement of the cam lever 42 causing compression of the spring 50 between the clamp washer 48 and the springe carrier 52 to provide a clamping force. This clamping force is sufficient to secure an air filter element in the air intake filter housing, as described above.

Figure 10A:
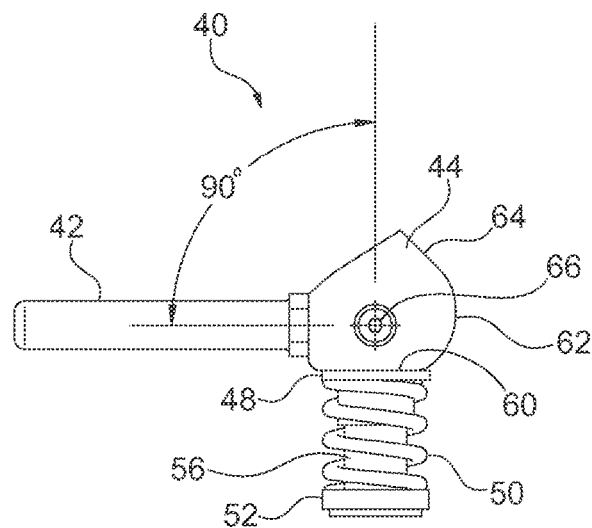
FIG. 10A is a side view of the cam lock system shown in FIG. 8 in a fully-open state.
Figure 10B:
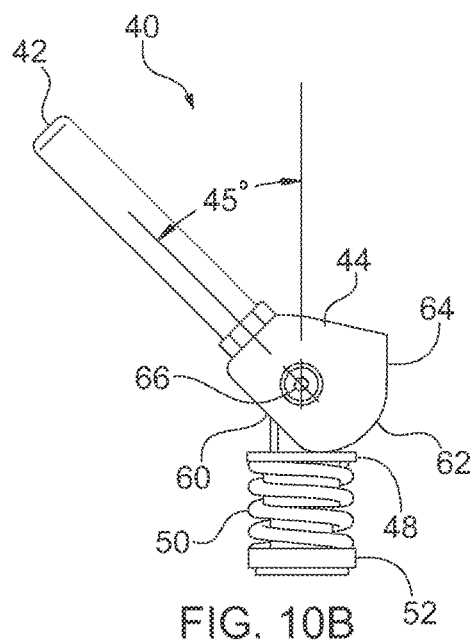
FIG. 10B is a side view of the cam lock system shown in FIG. 8 in a partially-open state.
Figure 10C:
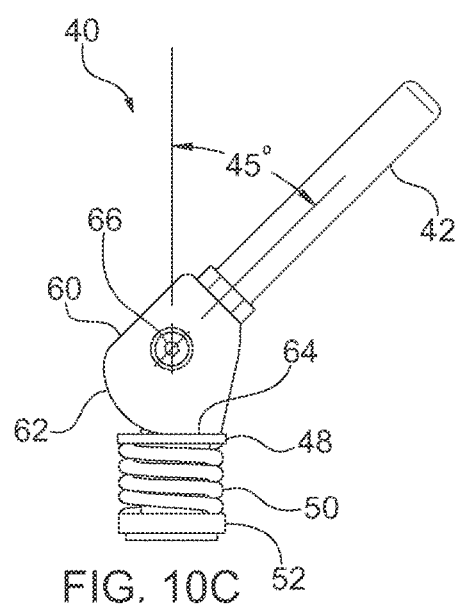
FIG. 10C is a side view of the cam lock system shown in FIG. 8 in a closed state.

Referring to FIGS. 10A-10C, cam lock device 40 in various stages of operation are illustrated. FIG. 10A shows cam lock device in a fully "open" position. In this fully open configuration, cam lever 42 is rotated 90° relative to a longitudinal axis of clevis rod 56, with the rotation being about a pivot axis 66 of filter clamp 44. A flat surface 60 of filter clamp 44 interacts with clamp washer 48 to hold the cam lock device 40 in this open configuration. Spring 50 is in a substantially uncompressed state, and therefore there is minimal clamping force between clamp washer 48 and spring carrier 52. Thus, in the configuration shown in FIG. 10A, a filter end cap would be able to be removed from a filter housing to allow for access to an air filter element therein, as cam lock device 40 would not provide the clamping force necessary to retain the filter end cap thereon.

FIG. 10B shows cam lock device 40 in a partially open position. That is, cam lever 42 is shown rotated 45° clockwise relative to the longitudinal axis of clevis rod 56. This rotation will cause filter clamp 44 to rotate about pivot axis 66, forcing an arcuate cam surface 62 of filter clamp 44 to interact with clamp washer 48. It is to be understood that filter clamp 44 may have one or more arcuate cam surfaces. Accordingly, spring 50 is partially compressed between clamp washer 48 and spring carrier 52, causing an increase in clamping force between clamp washer 48 and spring carrier 52. However, despite this increase in clamping force, cam lock device 40 in the configuration as shown in FIG. 10B would still not provide the clamping force necessary to retain the filter end cap on a filter housing.

Turning now to FIG. 10C, cam lock device 40 in a "closed" position is shown. Cam lever 42 is shown rotated 45° clockwise relative to the longitudinal axis of clevis rod 56 (and 90° clockwise from the position shown in FIG. 10B). While a 45° position is illustrated, it is to be understood that other angles of rotation are also possible and within the scope of the present disclosure. This additional rotation will cause filter clamp 44 to rotate about pivot axis 66, bringing a second flat surface 64 of filter clamp 44 into surface engagement with clamp washer 48. Accordingly, spring 50 is compressed between clamp washer 48 and spring carrier 52, causing a clamping force between clamp washer 48 and spring carrier 52 sufficient to retain the filter end cap (not shown) on a filter housing (not shown). As such, cam lock device 40 is a tool-less locking device for an air intake filter housing that represents a fully-encapsulated design having no loose parts.

The preferred aspects of the invention have been described in detail herein. However, it will be appreciated by those skilled in the art that various modifications and alternatives to the preferred aspects may be made to the invention without departing from the concepts disclosed in the foregoing description. Such modifications are to be considered as included within the following claims unless the claims, by their language, expressly state otherwise. Accordingly, the particular aspects described in detail hereinabove are illustrative only and are not limiting as to the scope of the invention, which is to be given the full breadth of the appended claims and any and all equivalents thereof.

The invention claimed is:

1. A cam lock system for an air intake filter housing, comprising:
   an annular filter housing for enclosing an air filter element;
   a filter end cap removably held in place at an open end of the annular housing by a cam lock device, the cam lock device comprising:
      a clevis rod having a first end and a second end, the clevis rod connected on the second end thereof to a mechanical element arranged within an interior of the filter housing;
      a cam handle;
      a filter clamp coupled to the cam handle, the filter clamp having a cam surface and being pivotally connected to the first end of the clevis rod;
      wherein the filter clamp comprises two flat surfaces,
      wherein a first flat surface of the two flat surfaces corresponds to an open condition of the cam lock device and a second flat surface of the two flat surfaces corresponds to a closed condition of the cam lock device;
      a spring carrier disposed at the second end of the clevis rod;
      a spring disposed on the clevis rod and restrained between the spring carrier and a washer disposed on the clevis rod; and
      wherein the cam surface engages the washer and pivotal movement of the cam handle and filter clamp causes compression of the spring via the washer to apply clamping force to the filter end cap to removably secure the filter end cap on the open end of the filter housing to secure the air filter element within the enclosed filter housing.

2. The cam lock system of claim 1, wherein the filter clamp is pivotally connected to the first end of the clevis rod via one of a pin, a screw, or a bolt.

3. The cam lock system of claim 1, wherein the cam handle is detachable from the filter clamp.

4. The cam lock system of claim 1, wherein the mechanical element is a bolt within the filter housing.

5. The cam lock system of claim 1, wherein the clevis rod is connected to mechanical element within the filter housing via a threaded connection.

6. A method of retaining an air filter element within an air intake filter housing, the method comprising:
   providing an annular filter housing for enclosing the air filter element;
   providing a filter end cap sized to close an open end of the filter housing, the filter end cap comprising an opening therein so as to allow a mechanical element disposed within an interior of the filter housing to extend therethrough;
   inserting the air filter element into the filter housing;
   enclosing the open end of the filter housing with the filter end cap;
   connecting a cam lock device to the mechanical element, wherein the cam lock device comprises:

a clevis rod having a first end and a second end, the clevis rod connected on the second end thereof to the mechanical element bolt disposed within the interior of the filter housing;

a cam lever; and a filter clamp coupled to the cam lever and having a cam surface thereon, the filter clamp pivotally connected to the first end of the clevis rod such that rotation of the cam lever and filter clamp in a first direction provides a clamping force to secure the filter end cap upon the open end of the filter housing;

wherein the filter clamp comprises two flat surfaces, a first flat surface of the two flat surfaces corresponding to an open condition of the cam lock device when the cam lever and filter clamp are rotated in the first direction, and a second flat surface of the two flat surfaces corresponding to a closed condition of the cam lock device when the cam lever and filter clamp are rotated in a second direction;

a spring carrier disposed at the second end of the clevis rod;

a spring disposed on the clevis rod and restrained between the spring carrier and a washer disposed on the clevis rod; and wherein the cam surface engages the washer and pivotal movement of the cam handle and filter clamp causes compression of the spring via the washer to apply clamping force to the filter end cap to removably secure the filter end cap on the open end of the filter housing and to secure the air filter element within the enclosed filter housing.

7. The method of claim 6, further wherein rotating the cam lever and filter clamp in a second direction different from the first direction releases the filter end cap from the open end of the filter housing.

8. The method of claim 6, further comprising disposing a cam washer, a spring carrier, and a spring about the clevis rod so as to supply the clamping force to secure the filter end cap upon the open end of the air intake filter housing when the cam lever and filter clamp are rotated in the first direction.

* * * * *

UNITED STATES PATENT AND TRADEMARK OFFICE
CERTIFICATE OF CORRECTION

PATENT NO. : 10,213,719 B2
APPLICATION NO. : 14/872799
DATED : February 26, 2019
INVENTOR(S) : Steven J. Knox, II et al.

Page 1 of 1

It is certified that error appears in the above-identified patent and that said Letters Patent is hereby corrected as shown below:

In the Claims

Column 6, Line 52, Claim 5, before "mechanical" insert -- the --

Signed and Sealed this
Eleventh Day of June, 2019

Andrei Iancu
*Director of the United States Patent and Trademark Office*